June 9, 1964 E. B. PRATT 3,136,622
PROCESS OF REDUCING PULVERIZED METALLIC OXIDE ORES
Filed Dec. 6, 1961
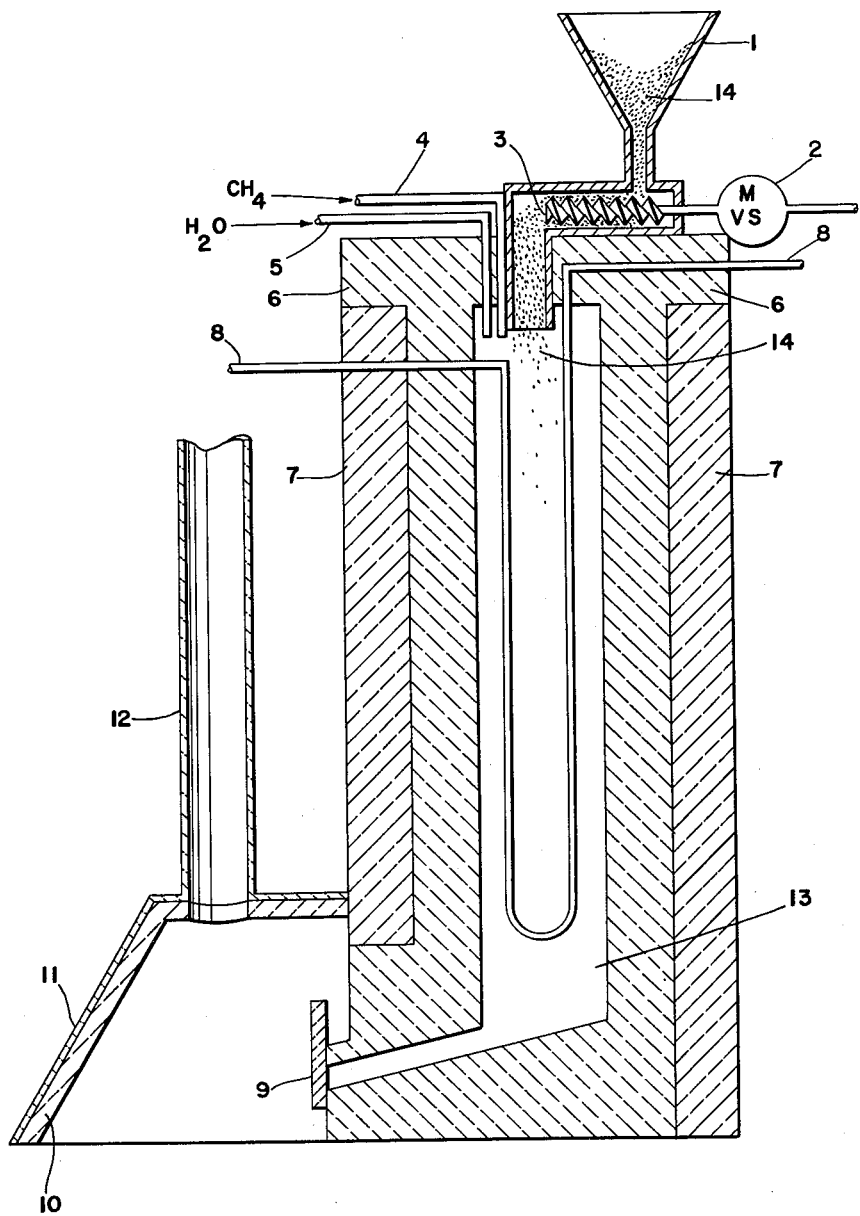
INVENTOR.
EMIL BRUCE PRATT United States Patent Office 3,136,622
Patented June 9, 1964

3,136,622
PROCESS OF REDUCING PULVERIZED METALLIC OXIDE ORES
Emil Bruce Pratt, East Cleveland, Ohio; Francis V. Pratt, administrator of the estate of said Emil B. Pratt, deceased
Filed Dec. 6, 1961, Ser. No. 157,397
1 Claim. (Cl. 75—10)

Atomic hydrogen may be produced by two different methods: (1) By the dissociation of a compound containing hydrogen. (2) By increasing the temperature of molecular hydrogen. This invention uses both methods jointly and simultaneously.

At the moment of dissociation hydrogen is in the atomic state and is called "nascent." Under normal conditions of room temperature it immediately reverts to molecular hydrogen, but if the temperature is rapidly increased it retains its atomic reactivity.

Investigations have shown that molecular hydrogen is converted to the atomic state by heat. At 1727° C. about 4% of the gas is in the atomic state; at 2700° C. about 30% is in that state.

Heretofore each of these methods has been used separately. But under each of these methods contact between a solid reactor such as iron ore and atomic hydrogen is fleeting, temporary, and difficult. This invention provides ample contact, time, and temperature for the most difficult reactions.

The drawing illustrates apparatus for carrying out the method of the present invention.

According to the present invention, reduction of pulverized metallic oxide ore is accomplished by injecting such ore at the top of a refractory tube heated to a temperature above 2000° C. so that the pulverized ore passes downwardly adjacent a vertically placed rod conducting an electrical current, whereby the rod supplies heat due to its electrical resistance and also creates a magnetic field which retards the downward movement of the ore. During such retarded downward movement of the ore, atomic hydrogen is formed in the tube by injecting a mixture of natural gas and water in stoichiometric amounts to effect the reaction:

$$CH_4 + H_2O = CO + 6H$$

This reaction is completed at about 900° C.; the hydrogen being at the instant of its creation, in the nascent, or atomic, state. Because the interior of the tube is at a temperature above 2000° C., however, the temperature of the hydrogen is rapidly elevated, and it is then prevented from reverting to the molecular state and maintained highly reactive during contact with the downwardly moving ore.

As shown in the drawing, the pulverized metallic ore is introduced through a hopper 1, whence it is propelled by a motor 2 driving a screw conveyor 3 into the top of a refractory tube 6 supported in an exterior tube 7.

Methane and water are also introduced into the tube 6 through conduits 4 and 5, respectively, the interior of the tube being at the time of introduction of the ore, methane and water heated to a temperature above 2000° C by passing an electrical current through a tungsten resistance rod 8 vertically disposed, as shown, with parallel vertical legs, within the tube 6.

As the pulverized ore moves downwardly within the tube 6, its movement is retarded by the magnetic field created by the electrical current passing through the rod 8, thus prolonging the contact of the ore with the atomic hydrogen evolved in the methane-water reaction. More complete reduction of the ore to the metallic state is thus made possible. The molten metal which collects in the bottom of the tube 6, at 13, may be removed through a gate 9, while waste gases may be discharged through a stack 12 provided with a base 11 lined with a refractory lining 10.

I claim:
In a process of reducing pulverized metallic oxide ores to molten metal with atomic hydrogen wherein the apparatus used in the process includes a refractory tube which is heated internally by a vertical tungsten resistance rod, said process comprising the steps of heating the inside of the refractory tube to a temperature above 2000° C., forming atomic hydrogen by injecting a mixture of natural gas and water in stoichiometric amounts to effect the reaction $CH_4 + H_2O = CO + 6H$, heating and reducing the ore to molten metal by injecting the pulverized metallic oxide ore at the top of the refractory tube so that the ore passes downward along the vertically placed rod thereby effecting a retarded downward movement of the ore due to an induced magnetic field around the tungsten rod and collecting the molten metal at the bottom of the refractory tube.

References Cited in the file of this patent
UNITED STATES PATENTS

| | | |
|---|---|---|
| 314,342 | Moore | Mar. 24, 1885 |
| 764,044 | Diesler | July 5, 1901 |
| 929,578 | Fuller | July 27, 1909 |
| 2,249,410 | Wilson | July 15, 1941 |

OTHER REFERENCES

Tyler, Paul M.: Plasma for Extractive Metallurgy, Journal of Metals, January 1961, pp 51–54.